United States Patent [19]

Walker

[11] 3,985,332

[45] Oct. 12, 1976

[54] NON-REFILLABLE SAFETY VALVE

[75] Inventor: Robert Walker, Providence, R.I.

[73] Assignee: Bristol Screw Products Corporation, Providence, R.I.

[22] Filed: Sept. 17, 1975

[21] Appl. No.: 613,989

[52] U.S. Cl. .............................. 251/111; 251/340
[51] Int. Cl.² ........................................ F16K 35/00
[58] Field of Search ............... 251/340, 347, 90, 93, 251/111, 113

[56] References Cited
UNITED STATES PATENTS

| | | | |
|---|---|---|---|
| 1,158,420 | 10/1915 | Schweinert et al. ................. | 251/347 |
| 3,552,432 | 1/1971 | Wagner .............................. | 137/523 |
| 3,856,262 | 12/1974 | Jordan ............................... | 251/340 |
| 3,861,476 | 1/1975 | Borsum ............................. | 251/111 X |

Primary Examiner—William R. Cline
Attorney, Agent, or Firm—Christen & Sabol

[57] ABSTRACT

A non-refillable safety valve for a pressure container. The valve includes a housing, having a central bore, which provides communication between a port and the pressure container for charging and selective discharging the pressure container. The central bore has a lower portion that is narrower than the upper portion of the central bore. A hollow knob unit, having a central bore, is in threaded engagement with the outer wall of the housing. A core, having a central bore, is slidably mounted in the central bore of the housing. The upper end of the hollow knob unit is mounted on the core in a rotatable manner and in fixed longitudinal relationship with the core. A sealing member is slidably mounted in the lower end portion of the central bore of the core. The core contains end stop means for preventing movement of the sealing member below the lower end of the core. The sealing member engages the interface ledge formed by the lower upper portions of the central bore of the housing when the core is moved the maximum possible distance into the central bore of the core or when refill is attempted after discharge of the pressure container. The core contains at least one passageway located in the core outwards from the sealing member for communication between the central bore of the core and said upper portion of the central core, of the housing. An engagable stop means is positioned between the outer surface of the housing and the inner surface of the hollow knob unit in order to limit retrograde or outward movement of the core to a position whereby the sealing member still engages the interface ledge when refilling the pressure container. The engagable stop means engages after the pressure container has been filled and the sealing member, the core and the knob unit have been moved into sealing position.

5 Claims, 6 Drawing Figures

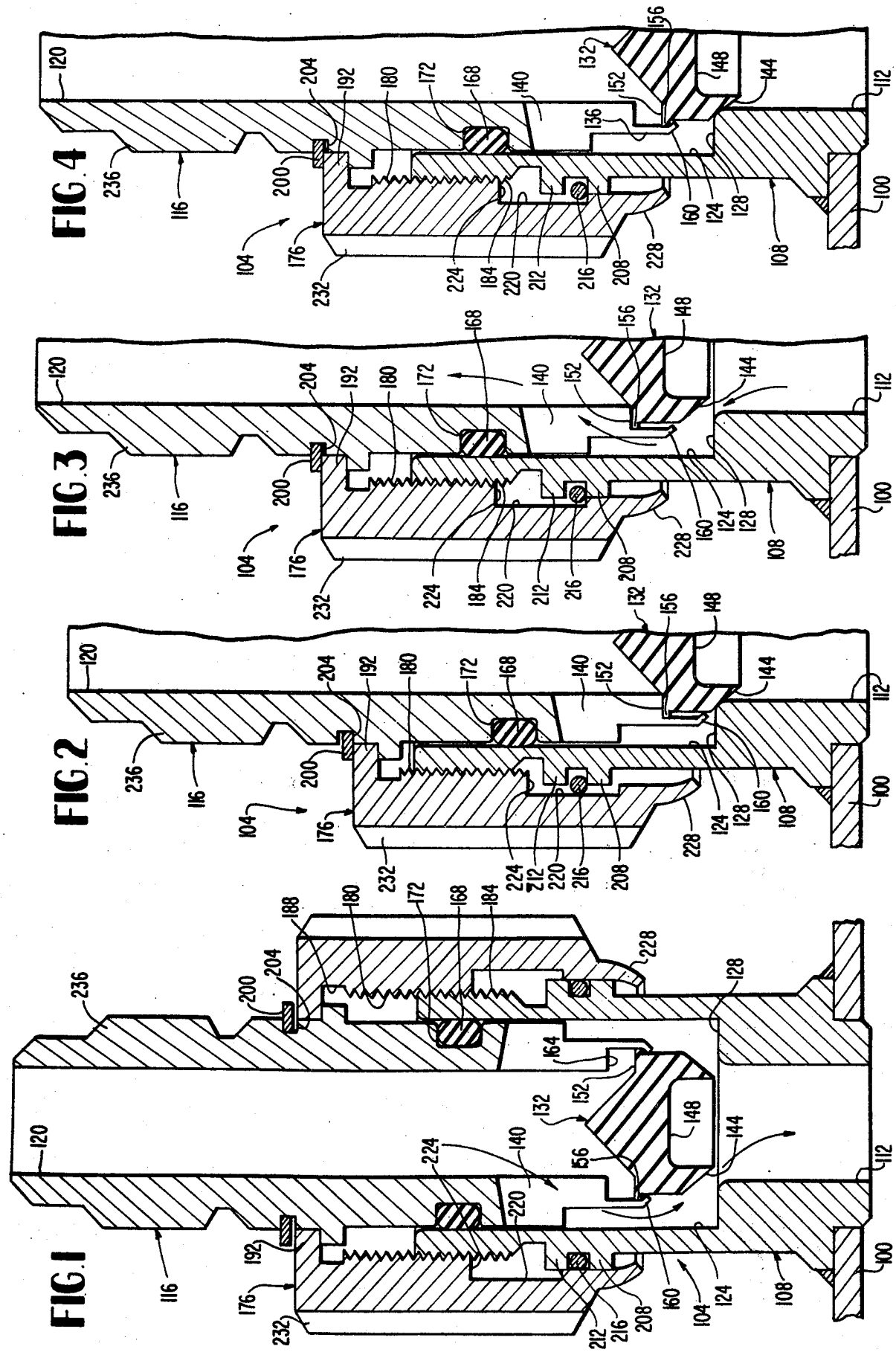

NON-REFILLABLE SAFETY VALVE

BACKGROUND OF THIS INVENTION

1. Field of This Invention

This invention relates to non-refillable or single use valves for pressurized systems.

2. Prior Art

Pressure tanks or other vessels are usually filled under carefully controlled conditions at a charging station and then distributed to various places for use. When empty it is intended that the vessel be returned to the charging center for appropriate reuse or destruction in the case of single use containers. Unfortunately, the attractive economies of refilling containers at points of use or otherwise repressurizing them under less than carefully supervised conditions has resulted, in the less consequential cases, in introduction of impurities or inferiors refills and, in the more consequential cases, to injurious explosions. The reuse of pressure vessels is highly objectionable for many reasons which relate to safety.

The need has long been felt for a valve which would allow normal filling of the pressure vessel under proper conditions, adequate sealing of the pressure vessel during nonuse, selective discharge of the pressure vessel, and effective prevention of improper and unauthorized refilling of the vessel.

U.S. Pat. No. 3,552,432 discloses an antirefillable valve for a pressure container. The valve includes: a housing providing communication between a port and the pressure container for charging and discharging the latter, a handle, including a stem portion, in threaded engagement with the housing; a sping-urged sealing member for closing and opening communication between the port and the container, the sealing member being mounted for mechanical movement by the handle and for hydraulic movement by container pressure against spring bias; and engageable stop means for limiting retrograde handle movement to below that required for mechanical opening of the sealing member.

BROAD DESCRIPTION OF THIS INVENTION

An object of this invention is to provide a non-refillable valve for pressure containers. Another object of this invention is to provide a non-refillable valve for pressure containers that fulfills the needs of the art re such systems. Other objects and advantages of this invention are set out herein or are obvious to one ordinarilly skilled in the art from this disclosure.

The valve of this invention achieves such objects and advantages.

This invention involves a non-refillable safety valve for a pressure container which comprises: the valve includes a housing, having a central bore, which provides communication between a port and the pressure container for charging and selective discharging the pressure container. The central bore has a lower portion that is narrower than the upper portion of the central bore. A hollow knob unit, having a central bore, is in threaded engagement with the outer wall of the housing. A core, having a central bore, is slidably mounted in the central bore of the housing. The upper end of the hollow knob unit is mounted on the core in a rotatably manner and in fixed longitudinal (spatial) relationship with the core. A sealing member is slidably mounted in the lower end portion of the central bore of the core. The core contains end stop means for preventing movement of said sealing member below the lower end of the core. The sealing member engages the interface ledge formed by the lower upper portions of the central bore of the housing when the core is moved the maximum possible distance into the central bore of the core or when refill is attempted after discharge of the pressure container. The core contains at least one passageway located in the core outwards from the sealing member for communication between the central bore of the core and the upper portion of the central core, of the housing. An engagable stop means is positioned between the outer surface of the housing and the inner surface of the hollow knob unit in order to limit retrograde or outward movement of the core to a position whereby the sealing member still engages the interface ledge when refilling the pressure container. The engageable stop means engages after the pressure container has been filled and the sealing member, the core and the knob unit have been moved into sealing position.

The valve of this invention is actually a non-refillable valve that allows one filling and selective discharging. The valve is designed to prevent, and does prevent, refilling of a pressure vessel. In this manner, the valve of this invention allows actual attainment of governmental requirements for a valve that prevents refilling of certain pressure vessels.

The valve of this invention is effective, but relatively simple, and is inexpensive to construct. The valve of this invention is fail-proof in the matter of charging, storing and selective discharging.

The non-refillable safety valve of this invention can be used for fluids, i.e., gases and/or liquids. The fluid can contain solids that are discharged from the pressure vessel as entrained solids, etc.

DETAILED DESCRIPTION OF THIS INVENTION

In the drawings:

FIG. 1 is a cross-sectional view of the valve of this invention in its filling position;

FIG. 2 is a fragmentary cross-sectional view of the valve of this invention in its closed position, ready for use;

FIG. 3 is a fragmentary cross-sectional view of the valve of this invention in its discharging position;

FIG. 4 is a fragmentary cross-sectional view of the valve of this invention in its refilling present position, after discharge;

Figure 5:
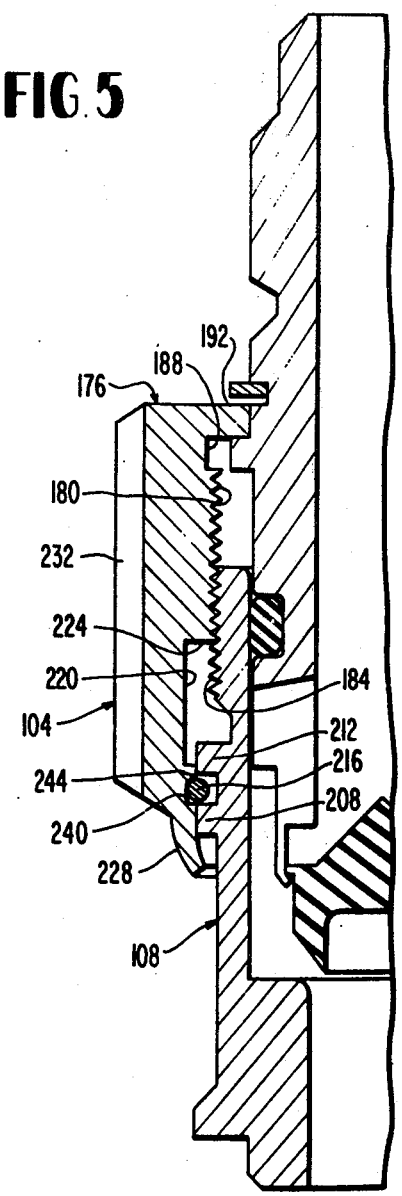
FIG. 5 is a fragmentary cross-sectional view of another embodiment of the valve of this invention in its filling position.

Referring to FIG. 1, pressure vessel or pressure system 100 is provided with non-refillable safety valve 104 for filling and selective emptying of vessel 100. Valve 104 can be welded or threaded to vessel 100, as shown in FIG. 1. Valve 104 is provided with housing 108 which has central bore 112. Central bore 112 communicates with interior of vessel 100. Hollow core 116, having central bore 120, is slidable mounted in the upper (or outer end) portion 124 of central bore 112. Ledge 128 separates upper portion 124 from the rest of central bore 112. Sealing member 132 is slidably mounted in lower portion 136 of central bore 120 of hollow core 116. The lower portion of hollow core 116 is provided with passageways 140 (preferably two to eight in number). Sealing member 132 is provided on its lower end with beveled edge 144 and pocket 148. Sealing member 132 is also provided with flat portion 152 on its upper end and with lip 156 on its upper end. Lip 156 is slidable in lower portion 136 of central bore 120 between end lip 160 of central bore 120 and ledge 164 (which separates lower 136 from the rest of central bore 120). Resilient sealing ring 168 is mounted groove 172 of hollow core 116, sealing the leeway between hollow core 116 and housing 108, but allowing slidable motion therebetween.

Hollow knob unit 176 is rotably mounted (in a helical movement manner) on the upper portion of housing 108 by means of screw thread portion 184 on the outside of housing 108 and screw thread portion 180 on the wall of central bore 188 of knob unit 176. Inner upper lip 192 of knob unit 176 rotably contacts hollow core 116. Lip 192 is affixed vertical positionwise (with little vertical play) with hollow core 116 by means of lip 196 of hollow core 116 and ring 200 (which is mounted in groove 204 of hollow core 116). This arrangement causes hollow core 116 to move in and out in relation to housing 108 in unison with knob unit 176. Housing 108 contains lips 208 and 212, spaced slightly apart. Split snap ring 216 (usually a cut single coil of spring wire) fits in the groove formed by lips 208 and 212. Central bore 188 of knob unit 176 has expanded portion 220, forming ledge 224. Ledge 224 allows inward motion of knob unit 176 and hollow core 116 until bevelled edge 144 of sealing member 132 is in contact with the rim of ledge 128 of housing 108 and flat portion 152 simultaneously is in contact with ledge 164 of hollow core 116. (The rim of ledge 128 is preferably curved to provide better seating of sealing member 132). Lower lip 228 of knob unit 176 restricts the outward motion of knob unit 176 and hollow core 116 in relation to housing 108. Knob unit 108 has a series of ribs 232 to facilitate gripping when turning knob unit 176.

In operation, valve 104 is initially in an open, ready-for-fill position as shown in FIG. 1. The fluid or gass follows the route of the collar portions 236 (which can be threaded if desired) if core 116 provides attachment means for a pressurized fluid source (not shown). Once pressure vessel 100 is filled, knob unit 176 is screwed inwardly until sealing member 132 is fully seated in the sealing position (see FIG. 2). As knob unit 176 is screwed inwardly, outwardly biased spring 216 snaps outwardly into channel 220. As desired, knob unit 176 can be screwed outwardly to allow the selective discharge of pressure vessel 100. Knob unit 176 can be screwed in and out as many times as desired in selectively discharging pressure vessel 100. Outwardly biased spring 216 (and lip 228) prevents knob unit from being completely unscrewed, thereby avoiding the danger of a flying metal portion to a user upon an explosive release of the pressurized contents of pressure vessel 100. The discharge route of the pressurized fluid is illustrated in FIG. 3 by the arrows — sealing member 132 is moved back out of the way by the pressure of the discharging gas or other fluid (e.g., liquid). FIG. 4 illustrates the mechanism that prevents pressure vessel 100 from being refilled. When in the open discharge position (as shown in FIG. 3), an attempt to refill causes sealing member 132 to engage the rim of ledge 128 (see FIG. 4) which seals against entry of gas into pressure vessel 100. Refill is even prevented when pressure vessel 100 still contains some pressurized fluid. Observe FIG. 3 — if a higher pressure fluid source (higher than the pressure in pressure vessel 100) was placed on the end of central core 120, such higher pressure fluid would cause sealing member 132 to readily seat in the sealing position, thereby preventing refilling of still-partially filled pressure vessel 100.

The valve of this invention is tamper-proof. For example, if ring 200 is removed, knob unit 176, core 116 and sealing member 132 still cannot be removed since outwardly-biased ring 216 prevents movement beyond that of the lower extremity of channel 220. Ring 216 cannot be seen or reached by one bent on tampering with the valve of this invention.

Lower lip 228 is not needed, but is preferred in order to keep knob unit 176 from becoming detached from housing 108 before valve 104 is used or filled. Lower lip 228 is usually formed by crimping the lower edge of knob unit 176 after knob unit 176 is threaded onto housing 108.

Figure 6:
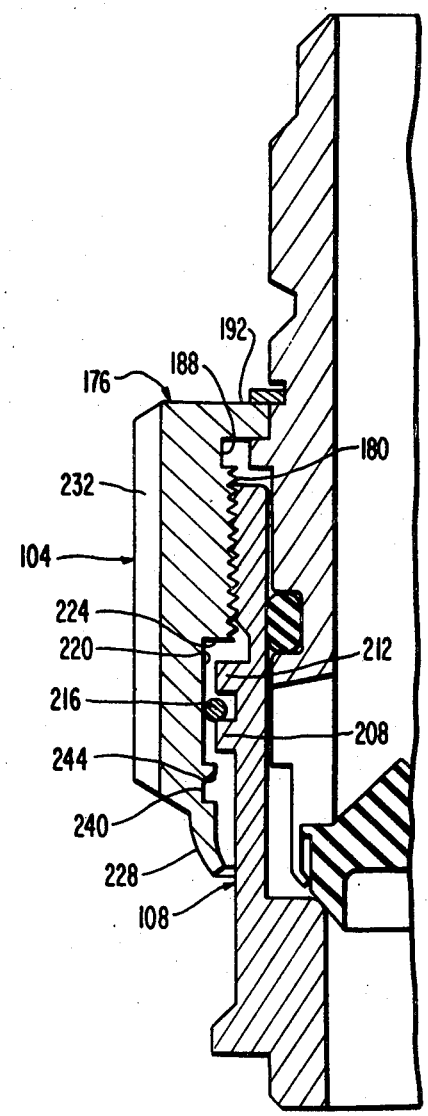
FIG. 6 is a fragmentary cross-sectional view of the embodiment of the valve of FIG. 5 in its closed position, ready for use.

In place of (or in addition to) lip 228, knob unit 176 can be provided with groove 240 opposite ring 216 — see FIG. 5, which correlates with FIG. 1. Outwardly biased spring unit 216 fits in groove 240 and the juxta-position groove formed by rims 208 and 212. In such a position, spring unit prevents removal of knob unit 176. As knob unit 176 is screwed inwardly, spring unit 216 slides down slanting face 244 of groove 240 and completely back into the groove formed by rims 208 and 212. Once knob unit 176 is screwed inwardly enough to reach channel 220, spring unit pops up into channel 220 as shown in FIG. 6 (which correlates with FIG. 2). Operation is then as described for in FIGS. 2 to 4.

Although the invention has been described with reference to some preferred embodiments it is not intended that the broad scope of the herein-described non-refillable safety valve of this invention be limited thereby but that some modifications and variations are intended to be included within the spirit and scope of the invention as defined by the following claims.

What is claimed is:

1. A non-refillable safety valve for a pressure container, which comprises:
   a. a housing, having a central bore, providing communication between a port and said pressure container for charging and selective discharging said pressure container, said central bore having a lower portion that is narrower than the upper portion of said central bore;
   b. a hollow knob unit, having a central bore, in threaded engagement with the outer wall of said housing;
   c. a core, having a central bore, slidably mounted in said central bore (a) of said housing, the upper end of said hollow knob unit being mounted on said core in a rotatable manner and in fixed longitudinal relationship with said core;
   d. a sealing member, which is slidably mounted in the lower end portion of said central bore (c) of said core, said core containing end stop means for preventing movement of said sealing member below the lower end of said core, said sealing member engaging the interface ledge formed by said lower portion and said upper portion of said central bore (a) when said core is moved the maximum possible distance into said central bore (c) or when refill is attempted after discharge of said pressure container, said core containing at least one passageway located in said core outwards from said sealing member for communication between said central bore (c) and said upper portion of said central core (a); and e. an engagable stop means, which is positioned between the outer surface of said housing and the inner surface of said hollow knob unit, for limiting retrograde or outward movement of said core to a position whereby said sealing member still engages said interface ledge when refilling said pressure container, said engagable stop means engaging after said pressure system has been filled and said sealing member, said core and said knob unit have been moved into sealing position.

2. A non-refillable safety valve as claimed in claim 1 wherein a slidable sealing member is located between said housing and said core.

3. A non-refillable safety valve as claimed in claim 2 wherein said slidable sealing member is a resilient O-ring.

4. A non-refillable safety valve as claimed in claim 1 wherein said core has two to eight of said passageways.

5. A non-refillable safety valve as claimed in claim 1 wherein said central bore (b) has a wider portion below where said knob unit threadably engages said housing, said engagable stop means is located inwardly from said wider portion of said central bore (b), when said valve is in the fill position, and said engageable stop means is a spring member that moves outwardly into said outer portion of said central bore (b) when said valve is in the sealing position after filling of said pressure container.

* * * * *